US008306222B2

(12) United States Patent
Bertin

(10) Patent No.: US 8,306,222 B2
(45) Date of Patent: Nov. 6, 2012

(54) REMOVABLE SECURE PORTABLE ELECTRONIC ENTITY INCLUDING MEANS FOR AUTHORIZING DEFERRED RETRANSMISSION

(75) Inventor: Marc Bertin, La Celle les Bordes (FR)

(73) Assignee: Oberthur Technologies, Levallois-Perret (FR)

( * ) Notice: Subject to any disclaimer, the term of this patent is extended or adjusted under 35 U.S.C. 154(b) by 980 days.

(21) Appl. No.: 12/066,267

(22) PCT Filed: Jul. 20, 2007

(86) PCT No.: PCT/FR2007/001256
§ 371 (c)(1),
(2), (4) Date: Mar. 18, 2008

(87) PCT Pub. No.: WO2008/015326
PCT Pub. Date: Feb. 7, 2008

(65) Prior Publication Data
US 2008/0307224 A1 Dec. 11, 2008

(30) Foreign Application Priority Data

Jul. 31, 2006 (FR) ...................................... 06 53212

(51) Int. Cl.
*H04N 7/167* (2011.01)
(52) U.S. Cl. ........ 380/200; 380/201; 380/205; 380/210; 726/9; 726/16; 726/26; 713/168; 713/182; 713/187

(58) Field of Classification Search ........................ None
See application file for complete search history.

(56) References Cited

U.S. PATENT DOCUMENTS

| 7,257,308 | B2 * | 8/2007 | Plourde et al. | 386/230 |
| 7,826,793 | B2 * | 11/2010 | Hong et al. | 455/3.06 |
| 2004/0059934 | A1 * | 3/2004 | Kohiyama et al. | 713/200 |
| 2005/0123278 | A1 * | 6/2005 | Yamashita et al. | 386/94 |
| 2005/0153736 | A1 * | 7/2005 | Ganton | 455/553.1 |
| 2006/0051071 | A1 * | 3/2006 | Poo et al. | 386/125 |
| 2008/0148333 | A1 * | 6/2008 | Kim et al. | 725/116 |

FOREIGN PATENT DOCUMENTS

| DE | 202006001690 | 4/2006 |
| EP | 1633133 | 3/2006 |
| JP | 2004193944 | 7/2004 |

* cited by examiner

*Primary Examiner* — Shewaye Gelagay
(74) *Attorney, Agent, or Firm* — Young & Thompson

(57) ABSTRACT

A removable secure portable electronic entity includes elements for receiving a broadcast digital content, elements for sending the received broadcast digital content, secure elements for deferred retransmission of the received digital content adapted to prohibit reproduction of the received digital content prior to sending it and to instigate the deferred sending of the received digital content by the sending elements, the elements being adapted to operate in parallel mode or in quasi-parallel mode. In variants, the secure deferred retransmission elements include a unit for storing the received digital content, for example a non-volatile memory. In variants, the secure deferred retransmission elements include members for authentication of a user.

Figure 1:
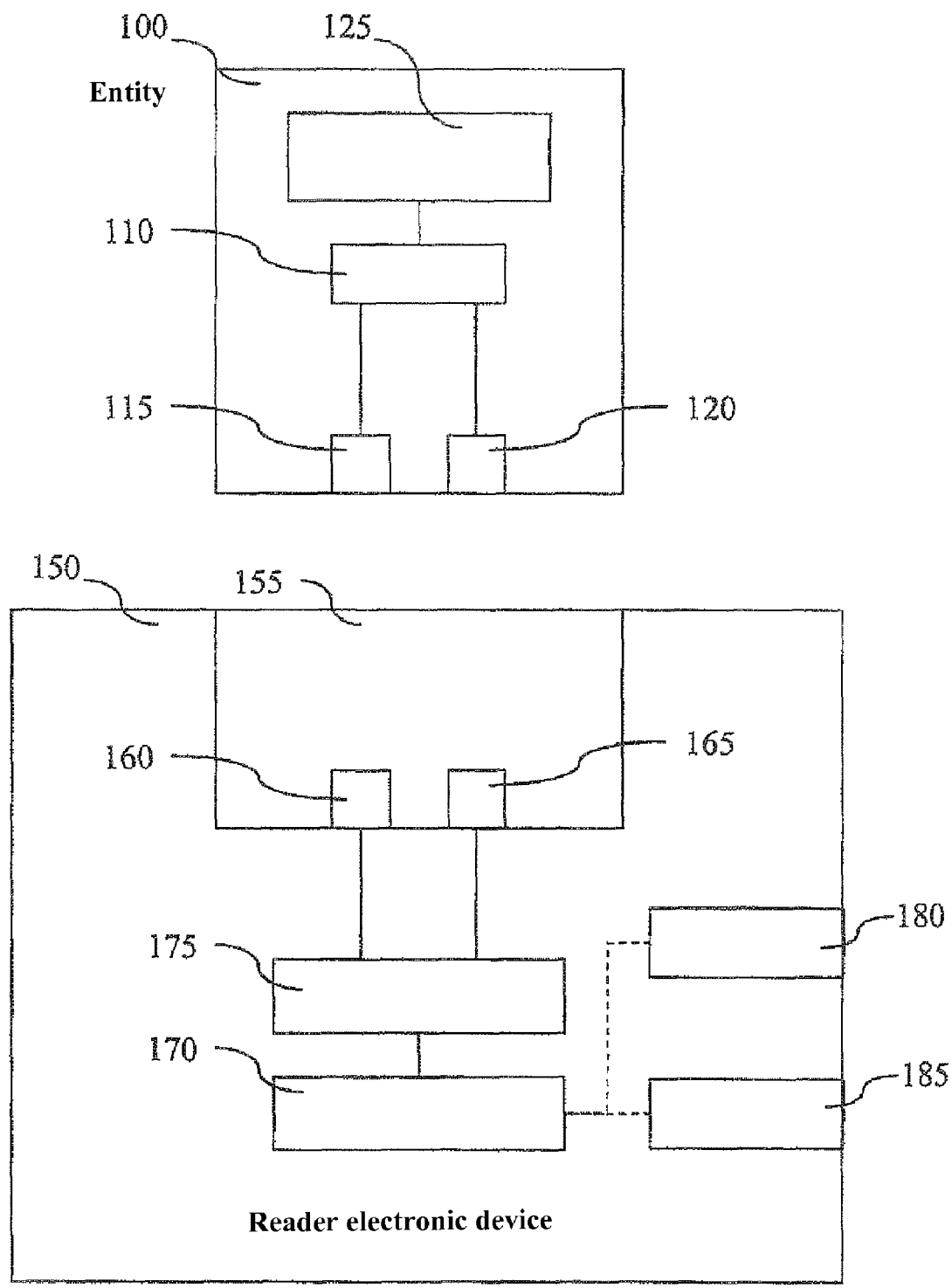

31 Claims, 6 Drawing Sheets

REMOVABLE SECURE PORTABLE ELECTRONIC ENTITY INCLUDING MEANS FOR AUTHORIZING DEFERRED RETRANSMISSION

BACKGROUND OF THE INVENTION

1. Field of the Invention

The present invention concerns a removable secure portable electronic entity including means for authorizing deferred retransmission. It applies, in particular, to removable information media including security means such as, for example, microchip cards with a secure microcontroller, conforming to the ISO 7816 standard, for example, USB (Universal Serial Bus) keys, SD (Secure Digital) cards, or a microcircuit card conforming to the MMC specification.

The invention also concerns an electronic device for reading this kind of electronic entity, or host terminal, including means for deferred retransmission of the content of the entity and, where applicable, means for receiving a broadcast content.

The present invention finds one application in the reception of a broadcast multimedia data stream, in particular the reception of terrestrial digital television or audiovisual streams broadcast over a computer network, for example the Internet or a telephone network, and, in particular, the reception of pay channels, tunes or films, necessitating either a subscription or a payment prior to viewing.

2. Description of the Related Art

One example of a portable electronic entity is an electronic key or "dongle", which generally comprises an interface enabling it to be connected to a host terminal, which can be a workstation, a computer, a mobile telephone, a personal digital assistant, a digital television, an MP3 player, for example. The interface of the electronic key usually conforms to the USB (Universal Serial Bus) standard, which defines a universal serial bus system developed for simple and fast management of exchanges of data between a host terminal and a peripheral device, for example a portable electronic entity, a keyboard or some other electronic device. The interface of the electronic entity can also conform to other standards such as the ISO 7816 standard, the PCMCIA (Personal Computer Memory Card International Association) standard or the MMC standard. The portable electronic entity can also comprise a contactless interface, in particular an interface conforming to the WiFi or Bluetooth (registered trademarks) or ISO 14443 standard.

The broadcast multimedia data stream includes multimedia data and/or programme data. In the case of multimedia data, an audio and/or visual application is required to be able to view or listen to the data. In the case of programme data, means are used to execute the data. The data is in particular in digital form, for example to the MPEG format or of DVB (Digital Video Broadcasting) type.

There is known from the document EP 1 633 133, entitled "Portable apparatus for enabling reproduction of television", a USB key including means for reception of a broadcast data stream and means for connection to a host terminal to send the host terminal data from the received data stream. The USB key described in the above document can also include means for recoding and compressing data.

However, the device described does not make reproduction of the received data secure.

Indeed, the device does not confer a totally satisfactory degree of security in that neither the host terminal nor the electronic entity is in fact secure. As a result of this a malicious person can obtain data from the stream and use it without having acquired the rights associated with that data.

It is necessary, in particular where pay channels are concerned, that only users who have acquired an authorization, also known as a license, are in a position to receive data.

There are known television receivers including storage means capable of reproducing at a given time a programme recorded previously, at the same time as recording a programme being broadcast at the same time. This function is referred to hereinafter as "deferred retransmission". Such receivers are described in the applications/patents U.S. Pat. No. 5,241,428 and EP-789488 in particular.

There is also known the document JP2004193944, which describes deferred retransmission applied to a mobile telephone capable of receiving and displaying a television programme, the programme being broadcast being recorded automatically during a telephone conversation in order for the user to be able to view the recorded programme afterwards.

However, recording a portion of a broadcast content to provide the deferred retransmission function causes security problems. Illicit copying of the broadcast content must be prevented.

SUMMARY OF THE INVENTION

The present invention aims to remove these drawbacks. To this end, the present invention is directed to a removable secure portable electronic entity including:

means for receiving a broadcast digital content,
means for sending said received broadcast digital content,
secure means for deferred retransmission of the received digital content adapted to prohibit reproduction of the received digital content prior to sending it and to instigate the deferred sending of the received digital content by the sending means,
said means being adapted to operate in parallel mode or in quasi-parallel mode.

Thanks to these provisions, the broadcast digital content is received and can be retransmitted, in particular to processing or display means, in a deferred and secure manner.

To this end, the receiving means continue to receive the broadcast digital content while the content already received is being retransmitted at a time later than the time of reception.

Thus these means are called upon to operate in parallel mode, in particular, if the electronic entity has a number of processors, or in quasi-parallel mode, if the electronic entity has only one processor, in order to be able to continue to receive the broadcast digital content and at the same time to effect retransmission.

The portable electronic entity comprising secure means, the reproduction of the received broadcast digital content is secure, thereby preventing illicit copying.

According to one particular feature, the electronic entity includes means for storing said received digital content.

According to this feature, the received digital content is stored, thereby enabling subsequent rereading for deferred retransmission of the content.

The storage means can be volatile memory (RAM) or non-volatile memory, for example flash memory.

According to particular features, the secure deferred retransmission means include means for authenticating a user.

Thanks to these provisions, access to the content to be retransmitted can be effected only by a legitimate user.

According to particular features, the secure deferred retransmission means include means for limiting the speed of sending of said content by the sending means or the number of retransmissions or the frequency of retransmission.

Thanks to these provisions, reproduction by fast transmission of the content for recording it on at least one information medium is slowed down and therefore rendered relatively ineffective. The sending speed is preferably limited to the speed of reception of said content.

According to particular features, the secure deferred retransmission means include encryption means adapted to encrypt the received digital content and means for decrypting the encrypted digital content.

According to particular features, the electronic entity as succinctly described hereinabove further includes means for storing encryption and/or decryption information.

According to particular features, said electronic entity includes means for storing at least part of a deferred retransmission application in a memory area of the secure portable electronic device.

Thanks to these provisions, modification of the execution of this application is prevented, which enhances the security of the retransmitted content. Protection is also provided against illicit copies of the application.

According to one particular feature, access to said memory of the secure portable electronic device is made secure by security means.

According to particular features, said application includes means for forming a man/machine interface adapted to control said application.

According to one particular feature, the man/machine interface is managed by means belonging to a host station.

According to particular features, said removable secure portable electronic entity includes means for executing said application, the security means being adapted to make execution of said application secure.

This protects the application itself and the means for executing it, which enhances security against modifications of the execution of this application and illicit copying of the application.

According to particular features, the deferred retransmission application uses a memory area reserved for said content and of predetermined size.

According to particular features, the deferred retransmission application includes means for configuring the size of said area for storing said content.

According to particular features, the deferred retransmission application is adapted, if said memory of predetermined size for storing said content is full, to command the retransmission of the content from the beginning of the buffer.

Thanks to these provisions, if the size of the memory area is limited, the content is broadcast in the order of its recording. The user is then certain to see the content if it can no longer be recorded.

According to particular features, the deferred retransmission application uses a read pointer and a write pointer in a cyclic memory adapted to store the received digital content.

According to particular features, said application is adapted to be executed in cooperation with a host station connected to said removable secure portable electronic entity after loading at least part of the application into the memory of that host station.

According to particular features, the deferred retransmission application is launched automatically after connection of the electronic entity to the host terminal.

According to particular features, the security means are adapted to make secure at least in part the execution of said deferred retransmission application loaded in this way and executed in the host terminal according to a predetermined security mode.

According to particular features, the security means are adapted to form, on each loading, at least a part of said deferred retransmission application.

According to particular features, the formation of said portion uses an unpredictable value.

According to particular features, the security means for the deferred retransmission application are furthermore adapted to make secure any modification made to said deferred retransmission application.

According to particular features, said deferred retransmission application uses at least one temporary cryptographic key.

According to particular features, the deferred retransmission application includes at least one main program executed by a host terminal and at least one auxiliary program stored and executed in said electronic entity connected to the host terminal, the main program generating commands for execution of all or part of said auxiliary program.

According to particular features, the auxiliary program is divided into a plurality of sections, each section being associated with an authentication code.

According to particular features, the electronic entity as succinctly described hereinabove includes means for verification of the authentication codes of the sections and means for disabling said entity in the event of negative verification.

According to particular features, the deferred retransmission application is adapted to decode the received digital content.

According to particular features, the electronic entity as succinctly described hereinabove includes means for converting the received digital content, said conversion means including a receive interface adapted to be connected to a receive antenna.

According to particular features, the electronic entity as succinctly described hereinabove includes means for converting the received digital content, said conversion means including a receive interface adapted to be connected to a cable network.

According to one particular feature, the electronic entity has, on its exterior surface, control means adapted to control playback, fast forward, fast rewind and recording of a received broadcast digital content.

The advantages, aims and particular features of this device and this system being similar to those of the removable secure portable electronic entity as succinctly described hereinabove, they are not repeated here.

BRIEF DESCRIPTION OF THE DRAWING FIGURES

Figure 2:
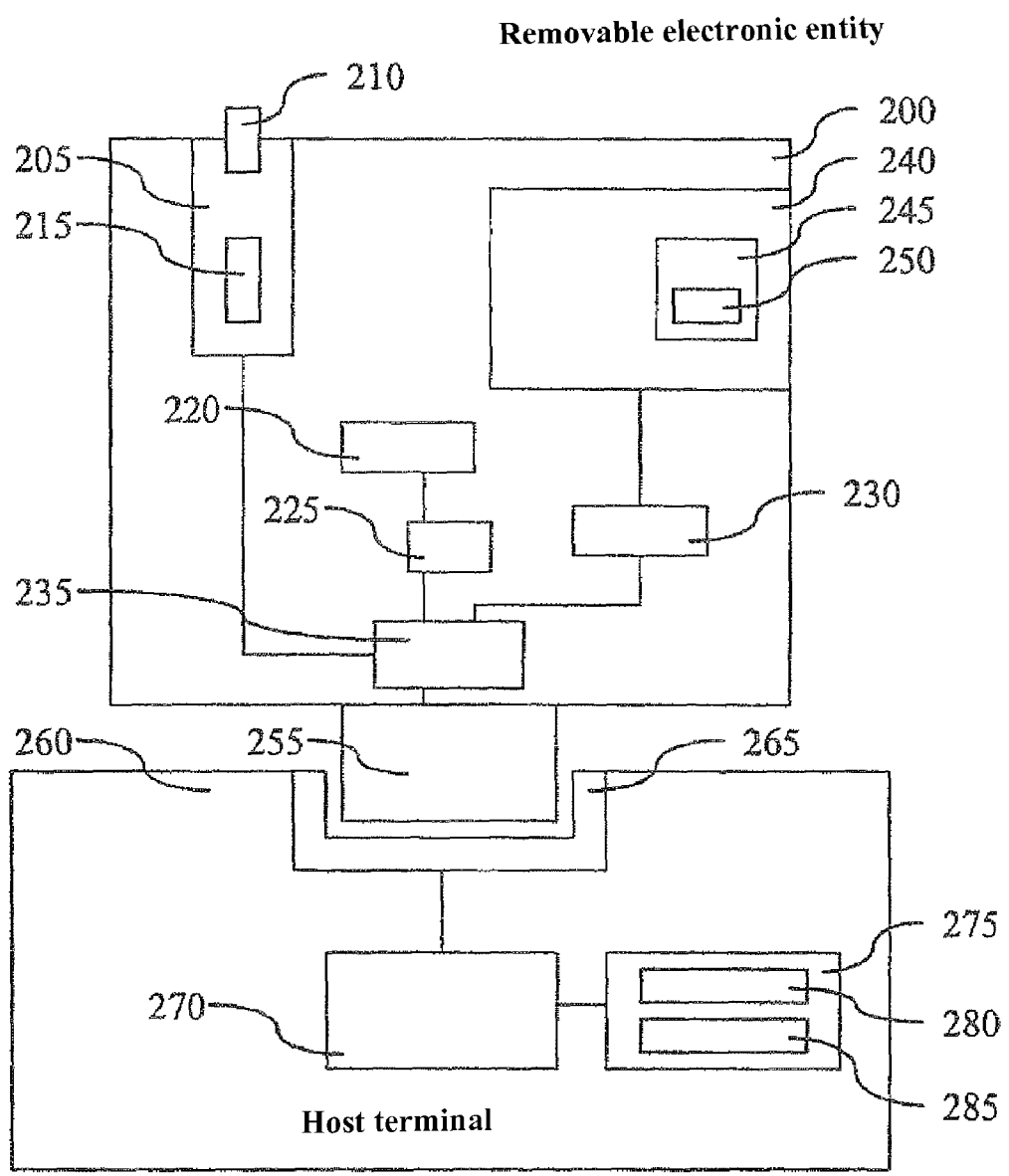
Figure 3:
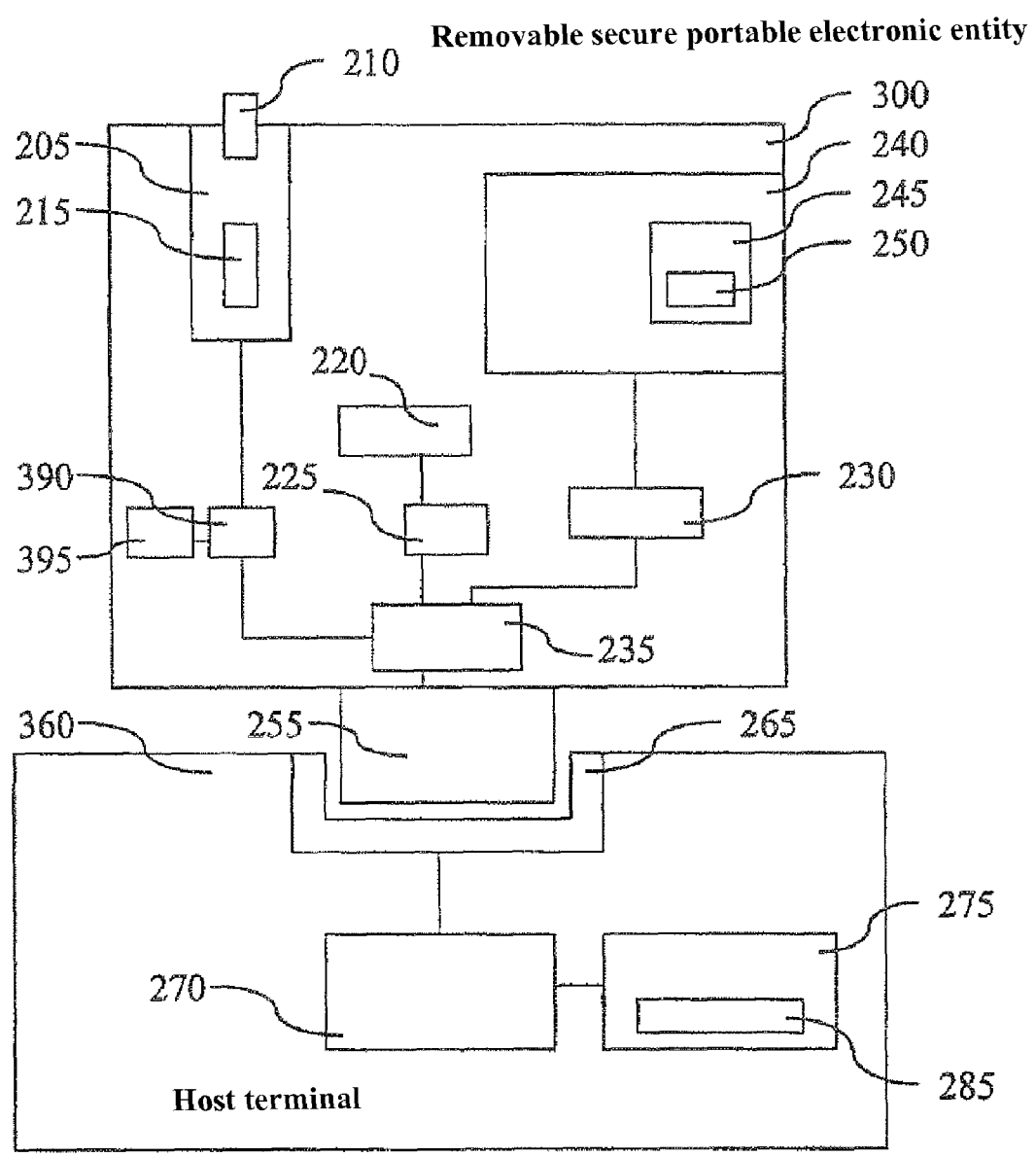
Figure 4:
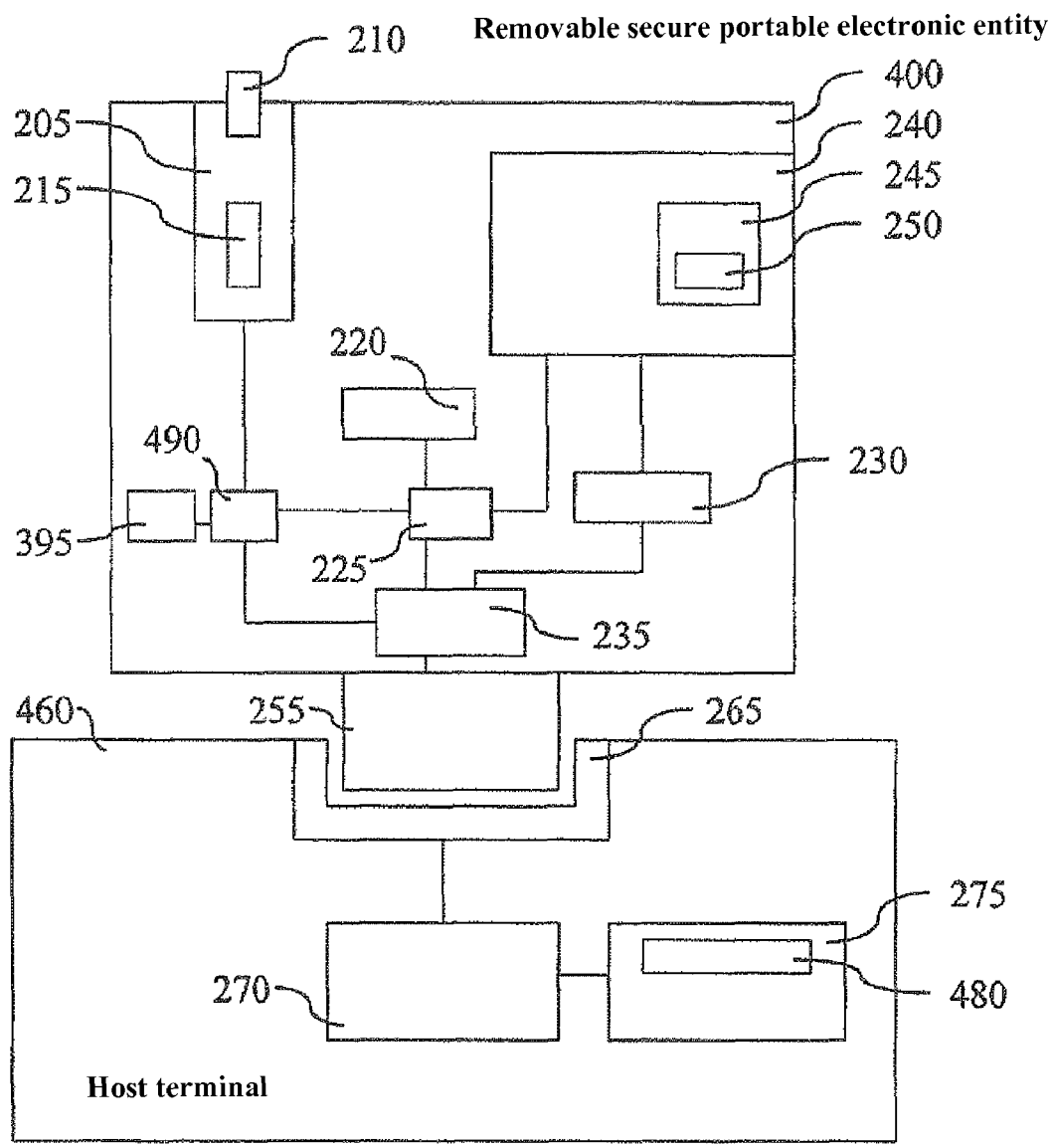
Figure 5:
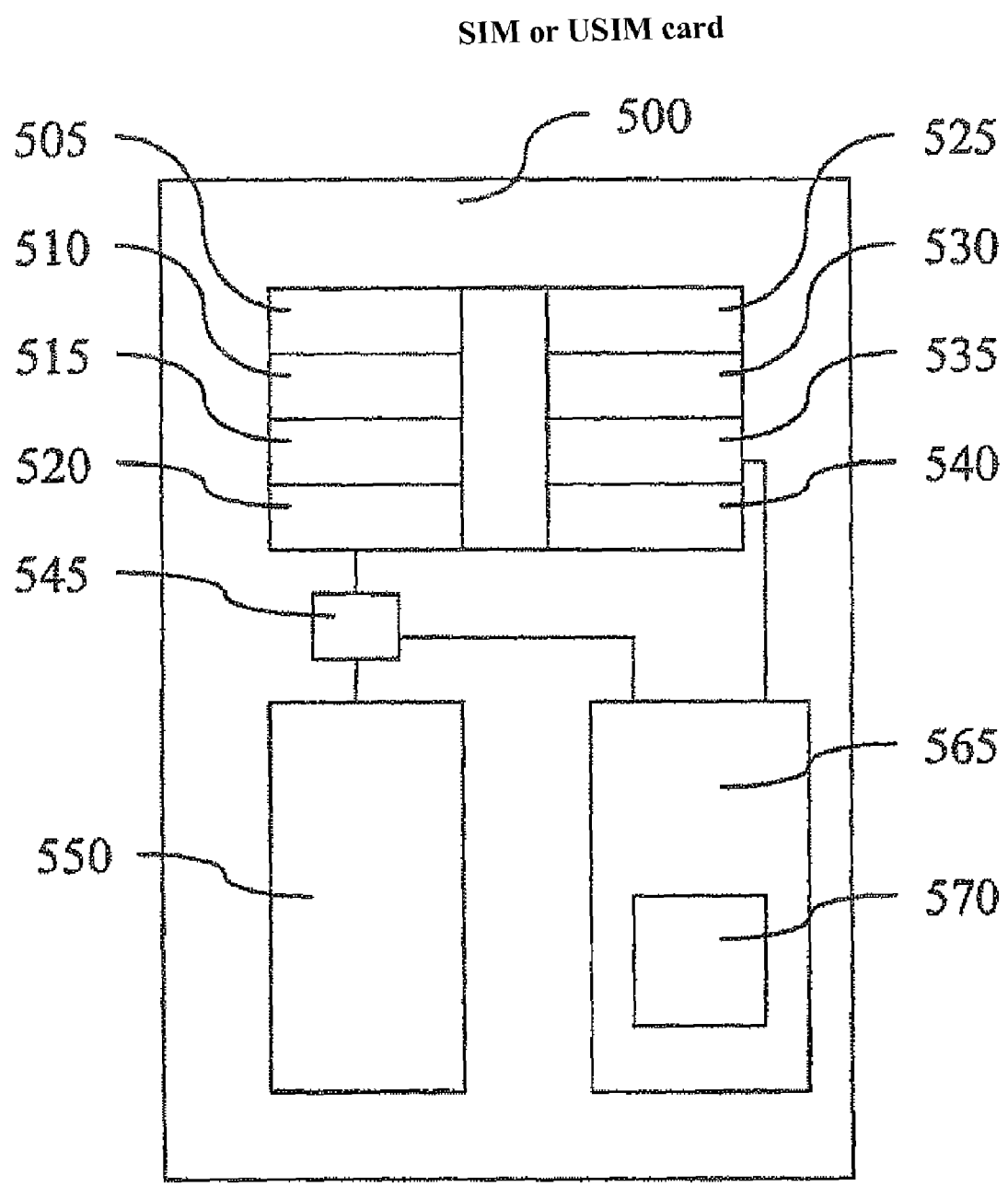
Figure 6:
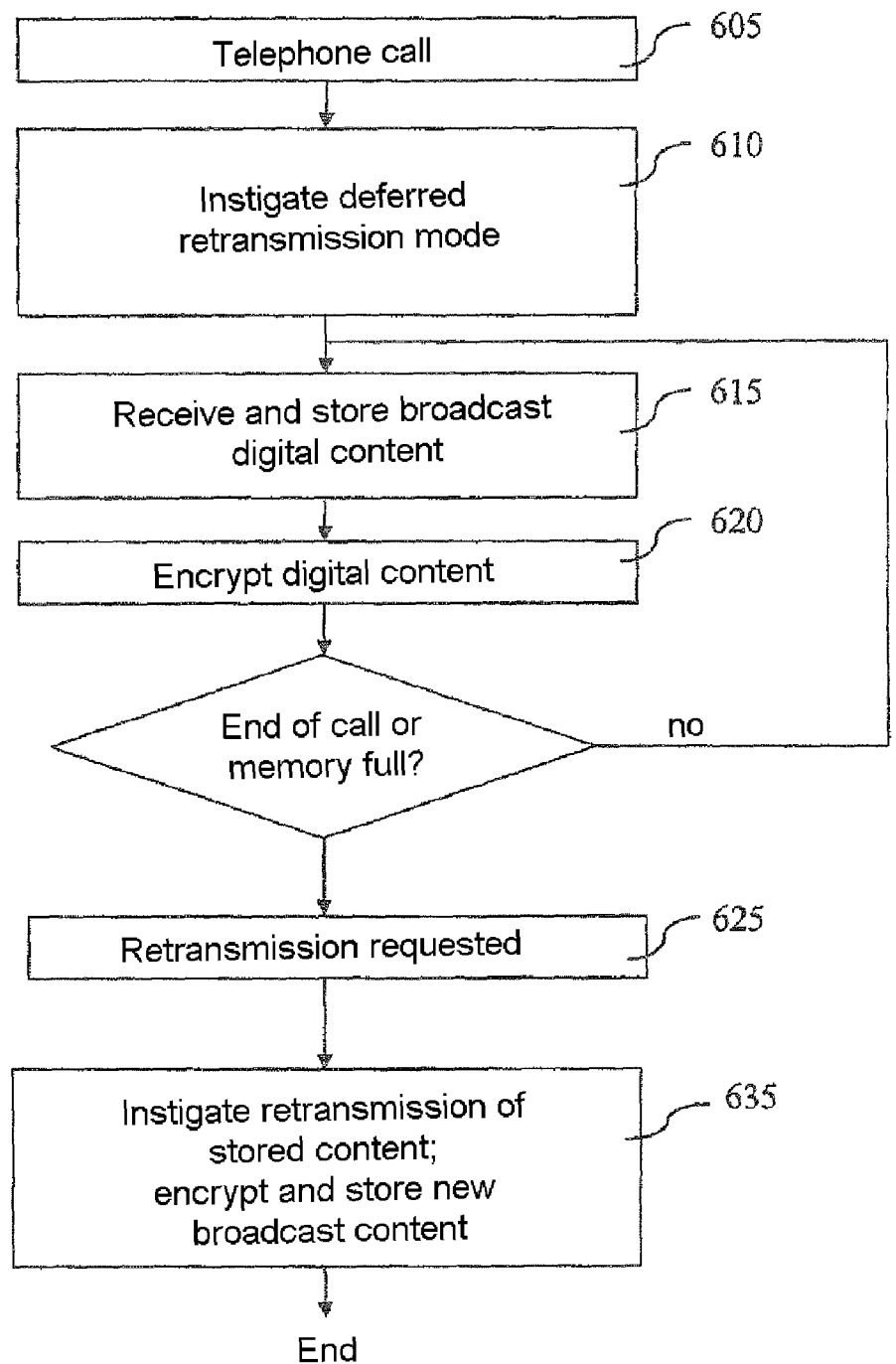

Other advantages, aims and features of the present invention will emerge from the following description, given by way of nonlimiting explanation and with reference to the appended drawings, in which:

FIG. 1 represents diagrammatically a first embodiment of the entity and the reader that are the subject matter of the present invention, FIG. 2 represents diagrammatically a second embodiment of the entity and the reader that are the subject matter of the present invention, FIG. 3 represents diagrammatically a third embodiment of the entity and the reader that are the subject matter of the present invention, FIG. 4 represents diagrammatically a fourth embodiment of the entity and the reader that are the subject matter of the present invention, FIG. 5 represents diagrammatically a fifth embodiment of the entity and the reader that are the subject matter of the present invention, and FIG. 6 represents, in the form of a flowchart, the steps executed in one particular embodiment of the method that is the subject matter of the present invention.

DETAILED DESCRIPTION OF THE INVENTION

The terms "broadcast digital content", "broadcast data stream" and "broadcast multimedia stream" are used interchangeably throughout the description. These broadcast contents or streams constitute the broadcast data processed by the removable secure portable electronic entity that is the subject matter of the present invention.

Throughout the description, the memory areas used are preferably of configurable size.

There is seen in FIG. 1 a removable secure portable electronic entity 100 and a reader electronic device 150 of the entity 100. The entity 100 includes a security controller 110, a clock signal input port 115, an input/output port 120, and a memory 125. The entity 100 is, for example, an MMC type card specifically dedicated to implementation of the present invention.

The reader electronic device 150, also referred to as a reader or a host station, includes a medium 155 of the entity 100, a clock output port 160, an input/output port 165, a programme memory 170, a controller 175, digital content receiving means 180, and digital content sending means 185 also referred to as retransmission means.

The receiving means include an antenna and an analog converter. Sending means are in particular connected to a screen and a loudspeaker, to reproduce the received digital content for the user.

In the embodiment of the present invention shown in FIG. 1, the secure deferred retransmission means adapted to make retransmission secure comprise the security controller 110 and the memory 125. The security controller 110 can be relatively rudimentary, if necessary. For example, in the case of a secure flash memory card, it can be a flash memory microcontroller, which has the specific feature of verifying a password to authorize access to the flash memory or a portion of the flash memory.

However, the security controller 110 is preferably more complex. In this case, the secure deferred retransmission means can include cryptographic means and/or means for making the controller 110 secure, for example by implementing countermeasures against attacks by generating faults or attacks by measuring currents.

The security controller 110 is preferably certified in accordance with the EAL (Evaluation Assurance Level) or FIPS (Federal Information Processing Standards) criteria.

In one particular embodiment, the security controller 110 is associated with or includes means for limiting the speed of sending of the digital content. The sending speed can in particular be determined relative to the volume of digital data to be transmitted, the time to reproduce that data, or some other parameter. Such limitation means use time measuring means internal to the electronic entity 100, in particular a clock, or are of the capacitor type as described in the document FR 2837959, for example.

By means of these internal measuring means, the limitation means are able to decide to prohibit the sending of a portion of the content of the memory 125, in particular when, after reception of a portion of a command, the content of the memory would be sent at a speed higher than the maximum authorized sending speed.

The security controller 110 is adapted to effect an authentication of the host station 150 before authorizing the deferred retransmission of the received digital content. For example, the security controller 110 is adapted to verify the authentication code supplied by the host station using techniques known in themselves.

The security controller 110 is adapted to place in the memory 125 an encrypted digital content. In some variants, the broadcast digital content being encrypted, it is placed in memory without decrypting it. In other variants, the digital content, where appropriate already encrypted, is decrypted by the security controller 110 before being placed in the memory 125 and, upon deferred retransmission of the digital content, the security controller 110 encrypts the stored digital content, for example by means of a temporary key shared with the host station.

The controller 175 and the program memory 170 are adapted to execute a deferred retransmission program conjointly with the execution of a program by the security controller 110.

Note that, in accordance with the invention, reception of broadcast digital content and retransmission are effected in parallel mode or in quasi-parallel mode. As a result, upon retransmission of the content already received, it is possible to continue the reception of the content being broadcast.

FIG. 2 shows components of a removable electronic entity 200, here forming a decoder "dongle" or a USB electronic key. In the embodiment shown in FIG. 2, the broadcast digital content, or the broadcast multimedia stream that is received, is stored in a memory 275 of a host terminal 260 and retransmitted by means divided between the entity 200 and the host terminal 260. The electronic entity 200 includes an interface 255 for connecting it to the port 265 of the host terminal 260.

In one embodiment, the interface 255 and the port 265 conform to the USB standard. Alternatively, the interfaces 255 and 265 are of PCMCIA or MMC type or conform to the ISO 7816 standard.

The host terminal 260 can receive, read and/or process data. To this end it includes a central processing unit (CPU) 270 and a random access memory 275, preferably of the non-volatile type, for example a hard disk, which includes the buffer area 280 and a software application memory area.

The storage of the broadcast digital content in the buffer 280 can be permanent, triggered by an event such as a change of topic or commanded via the man-machine interface managed by the information application 285 downloaded from the entity 200 into a volatile memory from the application 245. The digital content to be stored is encrypted by the entity 200 and decrypted by the host terminal 260 using a data processing application 285 downloaded from the entity 200 into a volatile memory.

This application 285 also performs the deferred retransmission of the digital content stored in the memory 280.

The electronic entity, here a USB key 200, is of a general kind consisting of circuits typically mounted on a printed circuit. Other architecture variants are obviously evident to the person skilled in the art.

The USB key 200, although of small size (being a pocket or hand-held electronic entity) combines the circuits described hereinafter. This kind of USB key 200 also has a connector (forming part of the interface referred to above) in line with its body, i.e. primarily a cap covering all of the electronic circuits and delimiting the exterior volume of the USB key 200.

A unit forming a concentrator 235, also known as a hub, is used to connect a plurality of peripherals conforming to the USB standard to the USB port 255, in a manner that is known in itself.

The entity 200 comprises a microchip card reader 225 adapted to communicate in accordance with the USB protocol and connected to the hub 235. The microchip card reader 225 is advantageously a standard USB peripheral the controllers whereof are integrated into the operating system of the host terminal 260, which has the advantage of avoiding the prior installation of such controllers when using the USB key 200. For example, the microchip card reader comprises a USB CCID (Chip Card Interface Device) type controller.

A microchip card 220 forming the secure deferred retransmission means is accommodated in the microchip card reader 225; the microchip card 220 (sometimes called a microcircuit card) is adapted in particular to authorize (i.e. to decide on and to command, as it were) the retransmission of the data and to secure that retransmission of the data. The microchip card 220 is a card to the ID-000 format conforming to the ISO 7816 standard, for example. The reader 225 comprises a housing to receive the card 220. A removable cap (not shown) enables the card 220 to be inserted into the appropriate housing, for example.

Alternatively, the microchip card 220 is a secure microcontroller type circuit adapted to communicate in accordance with the USB standard, for example a circuit fixed directly to and connected to the circuit of the entity 200, with no reader. This kind of secure microcontroller is also capable of deciding to retransmit data and to make retransmission of the data secure.

The entity 200 further comprises a memory 240. In practice, the memory 240 has at least one non-volatile portion. The memory 240 is a 128 Mbyte flash type memory, for example.

The memory 240 is controlled by a controller 230 itself connected to the hub 235.

The electronic entity 200 further includes means 205 for receiving a broadcast data stream, which means 205 convert a signal received into a secure multimedia data stream. These receiving means 205 comprise a receive interface, in particular a connector 210 adapted to be connected to an RF antenna or to a dish for receiving a stream transmitted by a satellite, or to a cable network. The receive interface can also be a wireless data receiver, for example conforming to the WiFi or Bluetooth standard.

Alternatively, the electronic entity 200 includes a receive antenna (instead of a connector to such an antenna).

The receiving means 205 also comprise conversion means, for example a tuner circuit and a demodulator circuit 215, for example a QPSK demodulator circuit.

The receiving means 205, connected to the hub 235, are therefore able to receive a data stream conforming to the MPEG or DVB format, for example. At this stage of the processing carried out, the data is still secure, for example encrypted by means of a cryptographic key.

The memory 240 stores a deferred retransmission application 245, comprising, in particular, means for decrypting the data of the received stream, means for decoding the broadcast stream, in particular adapted to extract MPEG format data from the DVB stream, decompression means, for example an MPEG decoder and means for managing a man-machine interface 250. This man-machine interface 250 takes the form of a rectangular window, for example, in which are displayed, on the one hand, the digital content and, on the other hand, control buttons, for example to play, pause, fast forward, fast rewind and record in a buffer 280 the broadcast stream received from the electronic entity 200 described hereinafter.

In practice, the controller 230 is capable of emulating the operation of a CD-ROM drive including autorun-type software for managing the deferred retransmission application 245. In other words, the software for managing the deferred retransmission application is executed automatically by the host terminal when the entity 200 connects to the host terminal 260.

In one embodiment, the deferred retransmission application 245 is stored in the memory 240 in a secure manner, for example by controlling access to this application by means of an identification code. Access to the application 245 is made secure by the controller 230 in collaboration with the microchip card.

Alternatively, the software for managing the deferred retransmission application 245 is loaded into a non-volatile ROM area of the controller 230.

In one embodiment, a new version of the deferred retransmission application 245 or another program is loaded.

This updating is managed by a program stored in the memory 240, for example. To this end, the program is connected in a secure manner to an authorized entity, for example to a server of the network, for example using the security means of the microchip card 220, in particular by authentication, encryption or signature.

The host terminal to which the entity is connected can be connected to a unidirectional or bidirectional communication network, for example to the Internet network or to a mobile telecommunication network.

This secure communication is effected in particular by means of a session key.

Furthermore, a session key $K_1$ can be used in the following embodiments to make communication between the electronic entity (USB key 200) and the host terminal 260, i.e. the deferred retransmission application here, secure.

In one embodiment, the secure (i.e. protected, for example encrypted) data stream is received by the entity 200 and decrypted by it (i.e. by decryption means installed in it), for example in receiving means 205, in particular in collaboration with the microchip card 220. The decrypted stream is then communicated to the deferred retransmission application 245 installed on the host terminal 260 after it has been encrypted by the session key $K_1$ in the entity 200, for example by encryption means in the receiving means 205, in particular in collaboration with the microchip card 220. The host terminal 260 then proceeds to a new decryption operation of the stream thanks to the session key $K_1$.

In another embodiment, the protected (or encrypted) data stream is received by the receiving means 205 of the entity 200. The information contained in the data stream is then sent to the microchip card 220. The latter determines from the information contained in the data stream (or received from elsewhere) a temporary encryption key $K_2$. The microchip card 220 then communicates the temporary encryption key $K_2$ to the receiving means 205 which then encrypt the temporary encryption key $K_2$ using the session key $K_1$ and sends the received data stream and the encrypted temporary encryption key $K_2$ to the deferred retransmission application 245 installed on the host terminal 260. The host terminal 260, which is holding the session key $K_1$, therefore has access to the temporary encryption key $K_2$ and can then proceed to decryption of the stream.

The session key is determined in particular from an internal key and an item of data extracted from the data stream or an item of data communicated by some other means: it is stored in the microchip card 220, for example, and sent to the host terminal 260 within the deferred retransmission application 245.

Note that, in a variant that is not shown, it is the host terminal 260 that includes the means for receiving broadcast digital contents, similar to the means 205, 210 and 215, and not the entity 200.

In one particular embodiment, the deferred retransmission application 245 has two parts: a main program executed by the host terminal 260 and at least one auxiliary program stored in memory 240 and executed by the entity 200 when it is connected to the host terminal 260.

In this context, the main program generates commands for execution of all or part of said auxiliary program, in particular after positive verification of the authentication of the bearer of the entity.

In one particular embodiment, the division of the deferred retransmission application 245 into two parts can be effected randomly, a first or main part executed by the host terminal 260 and another or auxiliary part executed by the entity 200. For example, the division areas are random. This random division can be operative on each loading of the deferred retransmission application 245 into the host terminal 260, for example as occurs automatically after each connection of the portable electronic entity 200 to the host terminal 260.

For example, the deferred retransmission application 245 can be divided into a plurality of sections beforehand in a memory area of the memory 240 or in a ROM area of the controller 230. Each section is further associated with communication instructions enabling communication between the terminal 260 and the entity 200. This association is operative in the case of dividing the deferred retransmission application 245 into a number of parts, for example. Groups of contiguous sections are then selected randomly and, of the communication instructions associated with each section, there are executed only the communication instructions separating two groups of sections selected in this way. In practice, each section of the deferred retransmission application 245 can be a different size. Each section consists of code written in machine language, assembler, C, Java, etc.

In the embodiment shown in FIG. 3, the digital content for deferred retransmission is stored in a removable secure portable electronic entity 300 and this stored content is retransmitted using means divided between the entity 300 and a host terminal 360. Note, in FIG. 3, that the entity 300 is similar to the entity 200 and includes all the elements of the entity 200, plus a memory controller 390 and a memory 395, which is preferably a non-volatile memory. The host terminal 360 is similar to the terminal 260 and includes all the elements of the terminal 260 with the exception of the memory area 280.

The broadcast digital content received by the entity 200 is encrypted and stored in the random access memory 395 by the memory controller 390 if it must be retransmitted in deferred manner. Note that, if the memory 395 is a non-volatile memory, the digital content can be retransmitted to another host terminal similar to the host terminal 260.

The memory 395 is preferably managed in a cyclic manner.

The memory controller 390 manages two pointers, where applicable under the control of the man-machine interface 250. The write pointer defines the position in the memory 395 at which the broadcast digital content that has just been received should be written. The read pointer defines the position in the memory 395 in which the digital content for deferred retransmission should be read.

As explained with reference to FIG. 6, if the memory 395 is full, i.e. if the write pointer rejoins the read pointer, the memory controller 390 immediately starts the reading of the digital content, i.e. the controller 390 reads the digital content and transmits it to the host terminal 360 where it is decrypted by the application 385 and retransmitted to a display screen (not shown).

This avoids overwriting a previously received digital content that has not been retransmitted with a new received broadcast digital content. Moreover, it avoids stopping storage in memory of the broadcast digital content being received. In this embodiment, the controller 390 is controlled by the application 285.

The controller 390 is adapted to authorize deferred retransmission after the presentation of an authentication code sent to the entity by the host terminal, this mode being stored in the memory 280, for example. Verification of authentication is effected by the microchip card 220, for example.

The controller 390 receives the data read in the memory 395 and checks the read and write pointers.

In one particular embodiment, the memory 395 is part of the memory 240 of the electronic entity 200, which part can be secure. In this embodiment, the functions of the controller 390 are executed by the controller 230, for example.

In the embodiment shown in FIG. 4, the digital content for deferred retransmission is stored in a removable secure portable electronic entity 400 and the stored content is retransmitted using means found only in that entity 400. In FIG. 4, note that the entity 400 is similar to the entity 200 and includes all the elements of the entity 200, plus a memory controller 490 and the memory 395, which is preferably a non-volatile memory. The host terminal 460 is similar to the terminal 260 and includes all the elements of the terminal 260 with the exception of the memory areas 280 and 285, which are replaced by a memory area 480.

The digital content received by the entity 400 is decrypted, the key being supplied by the microchip card 220, and stored in the memory 395, by the memory controller 490, when it has to be retransmitted in deferred manner. Note that, if the memory 395 is a non-volatile memory, the digital content can be retransmitted to another host terminal similar to the host terminal 460.

The memory 395 is preferably managed in a cyclic manner.

The memory controller 490 manages two pointers, where applicable under the control of the man-machine interface 250. The write pointer defines the position in the memory 395 at which the broadcast digital content that has just been received should be written. The read pointer defines the position in the memory 395 at which the digital content to be retransmitted in deferred manner must be read.

As explained with reference to FIG. 6, if the memory 395 is full, i.e. if the write pointer rejoins the read pointer, the memory controller 490 preferably launches immediately reading of the digital content, i.e. the controller 490 reads the digital content, decrypts it and sends it to the host terminal 360 where it is retransmitted to a display screen (not shown).

This avoids overwriting a previously received digital content that has not been retransmitted with a broadcast digital content being received. Moreover it avoids stopping storage of the broadcast digital content being received.

In this embodiment, the microchip card 220 controls the memory controller 490 and in particular the read pointer.

In one particular embodiment, the memory 395 is part of the memory 240 of the electronic entity 200, and this portion can be made secure. In this embodiment, the functions of the controller 490 are executed by the controller 230, for example.

In a different embodiment, the entity 400 has buttons on its outside surface for commanding deferred retransmission, in particular play, pause, fast rewind, fast forward and record.

Moreover, the retransmission application is stored in the memory 480 of the host terminal 460.

FIG. 5 shows a particular embodiment of the removable secure portable electronic entity that is the subject matter of the present invention, which takes the form of a SIM or USIM (Universal Subscriber Identity Module) card 500 also including an MMC interface. This card includes a common power supply contact 505, a reset to zero contact 510, a SIM clock contact 515, an MMC data communication contact 520, a common ground contact 525, an MMC clock contact 530, a SIM data input/output contact 535, an MMC control contact 540, a controller 545, a memory 550 adapted to store the receive broadcast digital content, a microcontroller 565 including an EEPROM storing and executing a secure deferred retransmission application 570, which is similar to the application 245, for example. This application is also adapted to execute the encryption, decryption and man-machine interface management functions described elsewhere. This memory stores a menu that the telephone can use subject to the decision of the user.

The microcontroller 565 is adapted to control access to the memory 550 via the controller 545. In one embodiment of the electronic entity 500, during reception by a telephone (not shown) including the entity 500 of a broadcast digital content to be retransmitted in deferred manner, the MMC data control contact 520 receives the content in order to store it in the memory 550. To this end, the telephone sends a command, in the form of an APDU (Application Protocol Data Unit) via the SIM data input/output contact 535 in order to command writing in the memory 550.

Deferred retransmission of the stored data is commanded by the telephone or by the secure deferred retransmission application 570. To this end, the stored data is read by the controller 545 (on reception of commands via the MMC command contact 540) under the control of the microcontroller 565 in order, on the one hand, to reproduce this data only to legitimate users and, on the other hand, to decrypt the data if necessary.

It is furthermore possible to limit the retransmission speed and the number or frequency of retransmissions.

One particular embodiment of the system consisting of the removable secure portable electronic entity and the host terminal is described next with reference to FIG. 6.

FIG. 6 is an algorithm showing an application of the invention to a combination of display means and a telephone.

During an incoming or outgoing telephone call (step 605), when the user is listening to or viewing the received broadcast digital content, the broadcast digital content is stored in order to be retransmitted subsequently. To this end, the deferred retransmission mode is triggered in the step 610.

Thus in the step 615 the broadcast digital content is received and stored.

The received content can also be encrypted during its storage (step 620).

If the end of the telephone call is detected (step 625), or the fact that the memory is full, then retransmission of the stored content is activated.

Thus retransmission is effected (step 635) while reception continues, the received broadcast content being stored for subsequent retransmission.

These operations are effected in parallel mode, in particular if the device has multiple processors, or in quasi-parallel mode if the device has only one processor.

During retransmission, the stored content can be decrypted if it was previously encrypted, in particular during the step 620.

Moreover, during retransmission, a check that retransmission can be effected is carried out so as to prohibit reproduction of the received digital content.

The invention claimed is:

1. A removable secure portable electronic entity, comprising:
    means for receiving a broadcast digital content,
    means for sending said received broadcast digital content to a host terminal,
    secure means for deferred retransmission of the received broadcast digital content configured to prohibit reproduction of the received broadcast digital content prior to sending the received broadcast digital content and to instigate deferred sending of the received broadcast digital content by the means for sending said received broadcast digital content, the secure means for deferred retransmission of the received broadcast digital content including means for limiting a speed of sending said received broadcast digital content and means for authorizing that authorizes prohibition of the sending to secure the received broadcast digital content,
    said means for receiving the broadcast digital content, means for sending said received broadcast digital content and secure means for deferred transmission configured to operate in parallel mode or in quasi-parallel mode, such that there is continuous recording of the digital content upon reception in memory, and reading of the recorded digital content at a point in memory is shifted from the point of recording due to an event; and
    wherein an application of the host terminal enabling decryption and deferred retransmission is downloaded from the electronic entity, and the application may optionally be divided into sections which are randomly selected.

2. The electronic entity according to claim 1, wherein the electronic entity includes means for storing said received broadcast digital content.

3. The electronic entity according to claim 1, wherein the secure means for deferred retransmission include means for authenticating a user.

4. The electronic entity according to claim 1, wherein the secure means for deferred retransmission include means for limiting a speed of sending of said content by the means for sending said received broadcast digital content a number of retransmissions or a frequency of retransmission.

5. The electronic entity according to claim 1, wherein the secure means for deferred retransmission include means for encryption configured to encrypt the received digital content and means for decrypting the encrypted digital content.

6. The electronic entity according to claim 5, wherein the electronic entity further includes means for storing encryption or decryption information.

7. The electronic entity according to claim 1, wherein the electronic entity includes means for storing at least part of a deferred retransmission application in a memory area of the secure portable electronic device.

8. The electronic entity according to claim 7, wherein access to said memory of the secure portable electronic device is made secure by said secure means for deferred retransmission.

9. The electronic entity according to claim 7, wherein the deferred retransmission application uses a memory area reserved for said content and of predetermined size.

10. The electronic entity according to claim 9, wherein the deferred retransmission application includes means for configuring the size of said area for storing said content.

11. The electronic entity according to claim 9, wherein the deferred retransmission application is configured, if said memory of predetermined size for storing said content is full, to command the retransmission of the content from a beginning of a buffer.

12. The electronic entity according to claim 7, wherein the deferred retransmission application uses a read pointer and a write pointer in a cyclic memory configured to store the received digital content.

13. The electronic entity according to claim 7, wherein said deferred retransmission application is configured to be executed in cooperation with the host terminal connected to said removable secure portable electronic entity after loading at least part of the application into the memory of the host terminal.

14. The electronic entity according to claim 13, wherein the deferred retransmission application is launched automatically after connection of the electronic entity to the host terminal.

15. The electronic entity according to claim 13, wherein means for security are configured to make secure at least in part the execution of said deferred retransmission application loaded and executed in the host terminal according to a predetermined security mode.

16. The electronic entity according to claim 15 wherein the means for security are configured to form, on each loading, at least a part of said deferred retransmission application.

17. The electronic entity according to claim 16, wherein an unpredictable value is utilized to form, on each loading, at least the part of said deferred retransmission application.

18. The electronic entity according to claim 15, wherein the means for security for the deferred retransmission application are furthermore configured to make secure any modification made to said deferred retransmission application.

19. The electronic entity according to claim 7, wherein said deferred retransmission application uses at least one temporary cryptographic key.

20. The electronic entity according to claim 7, wherein the deferred retransmission application includes at least one main program executed by the host terminal and at least one auxiliary program stored and executed in said electronic entity connected to the host terminal, the main program generating commands for execution of all or part of said auxiliary program.

21. The electronic entity according to claim 20, wherein the auxiliary program is divided into a plurality of sections, each section being associated with the authentication code.

22. The electronic entity according to claim 21, wherein the electronic entity includes means for verification of the authentication codes of the sections and means for disabling said entity in the event of negative verification.

23. The electronic entity according to claim 7, wherein the deferred retransmission application is configured to decode the received digital content.

24. The electronic entity according to claim 1, wherein the electronic entity includes means for converting the received digital content, said means for converting including a receive interface configured to be connected to a receive antenna.

25. The electronic entity according to claim 1, wherein while making a link between the authentication of or authorization to the host terminal that receives the electronic entity, deferred sending of the digital content is to the same host terminal.

26. The electronic entity according to claim 1, wherein the electronic entity is a microcircuit card.

27. The electronic entity according to claim 1, wherein the electronic entity is a Secure Digital Card.

28. The electronic entity according to claim 1, wherein the electronic entity is a SIM Card.

29. A system comprising:
an electronic entity comprising
means for receiving a broadcast digital content,
means for sending said received broadcast digital content,
secure means for deferred retransmission of the received broadcast digital content configured to prohibit reproduction of the received broadcast digital content prior to sending the received broadcast digital content and to instigate deferred sending of the received broadcast digital content by the means for sending said received broadcast digital content, the secure means for deferred retransmission of the received broadcast digital content including means for limiting a speed of sending said received broadcast digital content and means for authorizing that authorizes prohibition of the sending of the received broadcast signal;
said means for receiving the broadcast digital content, means for sending said received broadcast digital content and secure means for deferred transmission configured to operate in parallel mode or in quasi-parallel mode, such that there is continuous recording of the digital content upon reception in memory, and reading of the recorded digital content at a point in memory is shifted from the point of recording due to an event;
a host terminal, wherein storage of the broadcast digital content by the host terminal is in encrypted form before deferred transmission by the host terminal, and the electronic entity receives the broadcast digital content from a broadcasting network, and
wherein an application of the host terminal enabling decryption and deferred retransmission is downloaded from the electronic entity, and the application may optionally be divided into sections which are randomly selected.

30. The system according to claim 29, wherein an encryption key K2 encrypting the encrypted broadcast digital content in an entirety to the host terminal is also encrypted via a session key K1 shared between the electronic entity and the host terminal and transmitted from the electronic entity to the host terminal in the resulting encrypted form.

31. The system according to claim 29, wherein the received broadcast digital content is encrypted by the electronic entity before being transmitted to the host terminal.

* * * * *